(12) United States Patent
Czarnecki et al.

(10) Patent No.: US 11,113,605 B2
(45) Date of Patent: Sep. 7, 2021

(54) REINFORCEMENT LEARNING USING AGENT CURRICULA

(71) Applicant: DeepMind Technologies Limited, London (GB)

(72) Inventors: Wojciech Czarnecki, London (GB); Siddhant Jayakumar, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/417,522

(22) Filed: May 20, 2019

(65) Prior Publication Data

US 2019/0354867 A1 Nov. 21, 2019

Related U.S. Application Data

(60) Provisional application No. 62/673,747, filed on May 18, 2018.

(51) Int. Cl.
*G06N 3/08* (2006.01)
*G06N 20/20* (2019.01)
*G06N 3/04* (2006.01)

(52) U.S. Cl.
CPC ........... *G06N 3/084* (2013.01); *G06N 3/0454* (2013.01); *G06N 20/20* (2019.01)

(58) Field of Classification Search
CPC ....... G06N 20/20; G06N 3/084; G06N 3/0454
See application file for complete search history.

(56) References Cited

PUBLICATIONS

Egorov, M., "Multi-Agent Deep Reinforcement Learning", 2016, CS231n: Convolutional Neural Networks for Visual . . . , 2016 (Year: 2016).*
Zhou, Z-H., et al., "Ensembling neural networks: Many could be better than all", 2002, Artificial Intelligence 137 (2002) 239-263 (Year: 2002).*
Rusu, A. A., et al., "Policy Distillation", 2016, Proceedings of ICLR, retrieved from arXivas arXiv:1511.06295v2, https://arxiv.org/abs/1511.06295, retrieved on Feb. 10, 2020, 2016 (Year: 2016).*
Tanmay Gangwani.Jian Peng, "Policy Optimization By Genetic Distillation", conference paper at ICLR 2018,pp. 1-16, 2018. (Year: 2018).*

(Continued)

*Primary Examiner* — Kakali Chaki
*Assistant Examiner* — Vasyl Dykyy
(74) *Attorney, Agent, or Firm* — Fish & Richardson P.C.

(57) ABSTRACT

Methods, systems, and apparatus, including computer programs encoded on computer storage media, for reinforcement learning using agent curricula. One of the methods includes maintaining data specifying plurality of candidate agent policy neural networks; initializing mixing data that assigns a respective weight to each of the candidate agent policy neural networks; training the candidate agent policy neural networks using a reinforcement learning technique to generate combined action selection policies that result in improved performance on a reinforcement learning task; and during the training, repeatedly adjusting the weights in the mixing data to favor higher-performing candidate agent policy neural networks.

17 Claims, 6 Drawing Sheets

(56) References Cited

PUBLICATIONS

Chelsea Finn, Paul Christiano, Pieter Abbeel, Sergey Levin, "A connection between generative adversarial networks, inverse reinforcement learning, and energy-based models", ARXIV, Nov. 25, 2016, pp. 1-10. (Year: 2016).*
Ashok et al, "N2N Learning: Network to Network Compression via Policy Gradient Reinforcement Learning," arXiv, Dec. 17, 2017, 20 pages.
Ba and Caruana, "Do deep nets really need to be deep?" Advances in Neural Information Processing Systems, 2014, 2654-2662 2014.
Beattie et al., "Deepmind lab," https://arxiv.org/abs/1612.03801, Dec. 2016, 11 pages.
Bengio et al., "Curriculum learning," in ICML, Jun. 2009, 41-48.
Brockman et al., "OpenAI gym," arxiv.org/abs/1606.01540, Jun. 2016, 4 pages.
Bucilu et al., "Model compression," 12th ACM SIGKDD International Conference, 2006, 535-541.
Chen et al., "Net2net: Accelerating learning via knowledge transfer," arxiv.org/abs/1511.05641, Apr. 2016, 12 pages.
Elman, "Learning and development in neural networks: The importance of starting small," Cognition, Jul. 1993, 48: 71-99.
Espeholt et al., "Impala: Scalable distributed deep-rl with importance weighted actor-learner architectures," arxiv.org/abs/1802.01561v2, Feb. 2018, 20 pages.
Gangwani et al, "Policy Optimization by Genetic Distillation," arXiv, Nov. 3, 2017, 16 pages.
Graves et al., "Automated curriculum learning for neural networks," arXiv:1704.03003v1, Apr. 2017, 10 pages.
Heess et al., "Emergence of locomotion behaviours in rich environments," arXiv:1707.02286, Jul. 2017, 14 pages.
Hinton et al., "Distilling the knowledge in a neural network," arXiv:1503.02531, Mar. 2015, 9 pages.
Jacobs et al., "Adaptive mixtures of local experts," Neural computation, Mar. 1991, 3(1):79-87.
Jaderberg et al., "Population based training of neural networks," arxiv.org/abs/1711.09846, Nov. 2017, 21 pages.
Jaderberg et al., "Reinforcement learning with unsupervised auxiliary tasks," arxiv.org/abs/1611.05397, Nov. 2016, 14 pages.
Kempka et al., "Vizdoom: A doom-based ai research platform for visual reinforcement learning," IEEE Computational Intelligence and Games (CIG), Sep. 2016, 1-8.
Li and Yuan, "Convergence analysis of two-layer neural networks with ReLU activation," Advances in Neural Information Processing Systems, Nov. 2017, 597-607.
Liu et al, "Progressive Neural Architecture Search," arXiv, Mar. 24, 2019, 20 pages.
Matiisen et al, "Teacher-Student Curriculum Learning," arXiv, Nov. 29, 2017, 15 pages.
Mirowski et al. "Learning to navigate in complex environments," arxiv.org/abs/1611.03673, Jan. 2017, 16 pages.
Mnih et al., "Asynchronous methods for deep reinforcement learning," International Conference on Machine Learning, Jun. 2016, 1928-1937.
Parisotto et al., "Actor-mimic. Deep multitask and transfer reinforcement learning," ICLR, Feb. 2016, 16 pages.
PCT International Search Report and Written Opinion in International Appln. PCT/EP2019/062909, dated Sep. 13, 2019, 15 pages.
Ross et al., "A reduction of imitation learning and structured prediction to no-regret online learning," Proceedings of the fourteenth international conference on artificial intelligence and statistics, Jun. 2011, 627-635.
Rusu et al., "Policy distillation," arxiv.org/abs/1511.06295, Jan. 2016, 13 pages.
Simonyan and Zisserman, "Very deep convolution networks for large-scale image recognition," arxiv.org/abs/1409.1556, Dec. 2014, 13 pages.
Sutskever and Zaremba, "Learning to execute," arxiv.org/abs/1410.4615v2, Dec. 2014, 25 pages.
Teh et al., "Distral: Robust multitask reinforcement learning," In NIPS, Jul. 2017, 13 pages.
Wei et al., "Network morphism," Proceedings of the 33rd International Conference on Machine Learning, Jun. 2016, 564-572.
Wong et al, "Transfer Automatic Machine Learning," arXiv, Apr. 4, 2018, 17 pages.
Wu et al, "BlackDrop: Dynamic Inference Paths in Residual Network," arXiv, Apr. 12, 2018, 11 pages.
PCT International Report on Patentability in International Appln. PCT/EP2019/062909, dated Nov. 24, 2020, 9 pages.

* cited by examiner

REINFORCEMENT LEARNING USING AGENT CURRICULA

CROSS-REFERENCE TO RELATED APPLICATION

This application claims priority to U.S. Provisional Application No. 62/673,747, filed on May 18, 2018. The disclosure of the prior application is considered part of and is incorporated by reference in the disclosure of this application.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that trains a final action policy neural network that is used to select actions to be performed by a reinforcement learning agent interacting with an environment.

The system trains the final action policy neural network, i.e., the neural network that will be used to control the reinforcement learning agent after training, as part of a set of candidate agent policy neural networks. The final action policy neural network generally defines the most complex policy of any of the networks in the set, i.e., at least one other action policy neural network in the set defines an action selection policy that is less complex than the policy defined by the final action policy neural network.

At the outset of the training, the system initializes mixing data that assigns a respective weight to each of the candidate agent policy neural networks in the set.

The system then trains the candidate agent policy neural networks jointly to perform the reinforcement learning task. In particular, during the training, the system uses combined action selection policies that are a combination (in accordance with the weights in the mixing data) of individual action selection policies generated by the candidate networks in the set.

During the training, the system repeatedly adjusts the weights in the mixing data to favor higher-performing candidate agent policy neural networks e.g., by giving these a greater weight.

Because different networks in the set define action selection policies that have different complexity levels and because the weights between the different networks are adjusted throughout training, the set of agent policy neural networks is also referred to as a "curriculum" of agents.

The combined action selection policy may be used to select an action to be performed by the agent. However the reinforcement learning may be performed on-policy or off-policy. That is, training the candidate agent policy neural networks may be performed on-line or from previously generated training data stored in a replay memory (generated using an older version of the candidate agent policy neural network parameters).

As described in more detail later, here "more complex" in general relates to the complexity of training. Thus an action selection policy that is more complex may refer to a policy which takes longer to train, i.e., requires more training steps, than another action selection policy e.g., of another candidate agent policy neural network, to achieve the same performance, e.g., an average reward over a number of operational episodes or is less robust to different hyperparameter settings (e.g., learning rate, objective function weights, mini-batch size, etc). In some implementations an action selection policy that is more complex may correspond to a more complex architecture e.g., an agent policy neural network which is deeper or larger (has more units and/or parameters), or has more different types of layers e.g., including a recurrent layer. In some implementations an action selection policy that is more complex may correspond to one that operates in a larger action space i.e., has more actions from which to select, whilst learning to perform the same task.

In some implementations the candidate agent policy neural networks are trained to generate action selection policies that are aligned with other action selection policies generated by the other candidate agent policy neural networks by processing the same training network input. For example the reinforcement learning loss may include a cost which aligns the policies such as a cost dependent upon a difference between the policies, e.g., depending upon the type of reinforcement learning, a measure of difference between policy output distributions.

The system may decrease the impact of training the candidate agent policy neural networks to generate action selection policies that are aligned as the weight for the final agent policy neural network is increased. That is, the system may gradually switch over from using the plurality of candidate agent policy neural networks to using the final agent policy neural network, and in the limit may rely solely on the final agent policy neural network for selecting an action. This may be achieved by adjusting the weight assigned to the mixing updates as training progresses.

In implementations generating the combined action selection policy may comprise processing the training network input using each of the candidate agent policy neural networks to generate a respective action selection policy (output) for each candidate agent policy neural network, and combining the action selection policies in accordance with the weights as of the training iteration to generate the combined action selection policy.

In principle the weights may be adjusted by hand, or using an appropriate annealing strategy. However in some implementations a population of combinations of candidate agent policy neural networks is trained. The weights may then be adjusted by, during the training, adjusting the weights used by lower-performing combinations based on weights used by higher-performing combinations. For example a population-based training technique may be used, as described later, such that badly performing combinations (as measured by a performance metric of the combined action selection policy) copy the neural network parameters of stronger combinations and perform local modifications of their hyperparameters such that badly performing combinations are used to explore the hyperparameter space. Any convenient performance metric dependent upon the quality of the combined policy outputs generated during the training may be used, e.g., reward over k episodes.

Particular embodiments of the subject matter described in this specification can be implemented so as to realize one or more of the following advantages.

By using a curriculum over agents in training as described in this specification (i.e., by adjusting the weights as described in this specification), a complex agent can learn, i.e., a complex agent policy selection neural network can be trained, to perform a reinforcement learning task using fewer computational resources and less training time than conventional approaches. In particular, by leveraging the knowledge of less complex agents in the curriculum, the more complex agent can quickly achieve high performance on the reinforcement learning task, i.e., much quicker than if the complex agent was being trained on the particular task in a stand-alone manner. In fact, in some cases, by making use of the agent curriculum, a complex agent can quickly achieve high performance on a task even if the agent would not have been able to learn the task from scratch when trained in a stand-alone manner. In other words, the more complex agent can bootstrap from solutions found by simpler agents to learn tasks that the agent could not have otherwise learned or to learn the tasks in many fewer training iterations than would have otherwise been required. Additionally, by distributing the training and the adjusting of the weights as described in this specification, the overall training time can be decreased relative to training just a single final agent even though multiple agents are being trained jointly.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
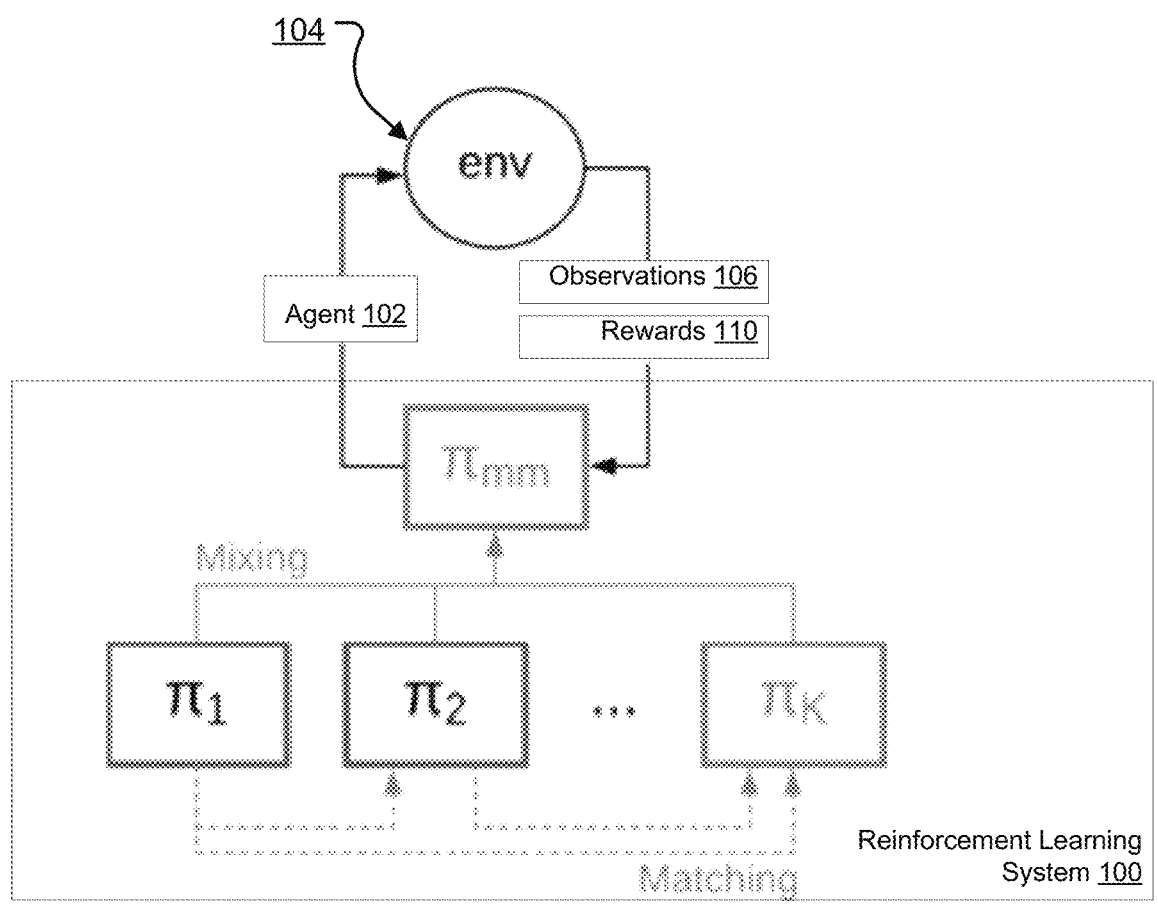
FIG. 1 shows an example reinforcement learning system.

FIG. 1 shows an example reinforcement learning system 100. The reinforcement learning system 100 is an example of a system implemented as computer programs on one or more computers in one or more locations, in which the systems, components, and techniques described below can be implemented.

The reinforcement learning system 100 trains an agent policy neural network through reinforcement learning for use in controlling an agent 102 to perform a reinforcement learning task while interacting with an environment 104.

In particular, at each time step during the training, the reinforcement learning system 100 receives data characterizing the current state of the environment 104. Data characterizing the state of the environment will be referred to in this specification as an observation 106. In response to the observation, the system 100 selects an action to be performed by the agent 102 and causes the agent 102 to perform the selected action. Once the agent 102 has performed the selected action, the environment 104 transitions into a new state and the system 100 receives a reward 110.

In general, the reward 110 is a numerical value. The reward 100 may indicate whether the agent 102 has accomplished the task, or the progress of the agent 102 towards accomplishing the task. For example, if the task specifies that the agent 102 should navigate through the environment to a goal location, then the reward at each time step may have a positive value once the agent reaches the goal location, and a zero value otherwise. As another example, if the task specifies that the agent should explore the environment, then the reward at a time step may have a positive value if the agent navigates to a previously unexplored location at the time step, and a zero value otherwise.

In some implementations, the environment is a real-world environment and the agent is a mechanical agent interacting with the real-world environment, e.g., a robot or an autonomous or semi-autonomous land, air, or sea vehicle navigating through the environment.

In these implementations, the observations may include, e.g., one or more of: images, object position data, and sensor data to capture observations as the agent as it interacts with the environment, for example sensor data from an image, distance, or position sensor or from an actuator.

For example in the case of a robot the observations may include data characterizing the current state of the robot, e.g., one or more of: joint position, joint velocity, joint force, torque or acceleration, e.g., gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In these implementations, the actions may be control inputs to control the robot, e.g., torques for the joints of the robot or higher-level control commands, or the autonomous or semi-autonomous land, air, sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g., steering, and movement e.g., braking and/or acceleration of the vehicle.

In some implementations the environment is a simulated environment and the agent is implemented as one or more computers interacting with the simulated environment.

The simulated environment may be a motion simulation environment, e.g., a driving simulation or a flight simulation, and the agent may be a simulated vehicle navigating through the motion simulation. In these implementations, the actions may be control inputs to control the simulated user or simulated vehicle.

In another example, the simulated environment may be a video game and the agent may be a simulated user playing the video game. Generally, in the case of a simulated environment, the observations may include simulated versions of one or more of the previously described observations or types of observations and the actions may include simulated versions of one or more of the previously described actions or types of actions.

In the case of an electronic agent the observations may include data from one or more sensors monitoring part of a plant or service facility such as current, voltage, power, temperature and other sensors and/or electronic signals representing the functioning of electronic and/or mechanical items of equipment.

In some other applications the agent may control actions in a real-world environment including items of equipment, for example in a data center, in a power/water distribution system, or in a manufacturing plant or service facility. The observations may then relate to operation of the plant or facility. For example the observations may include observations of power or water usage by equipment, or observations of power generation or distribution control, or observations of usage of a resource or of waste production. The actions may include actions controlling or imposing operating conditions on items of equipment of the plant/facility, and/or actions that result in changes to settings in the operation of the plant/facility e.g., to adjust or turn on/off components of the plant/facility.

The system 100 trains the final action policy neural network, i.e., the neural network that will be used to control the reinforcement learning agent after training, as part of a set of candidate agent policy neural networks. In the example of FIG. 1, the neural networks in the set are denoted as $\pi_1$ through $\pi_K$, with $\pi_K$ denoting the final action policy neural network.

Generally, each action policy neural network in the set receives a network input including an observation and generates a network output that defines an action selection policy for selecting an action to be performed by the agent in response to the observation.

In some implementations, the network output defines a likelihood distribution over actions in a set of possible actions. For example, the network output may include a respective numerical likelihood value for each action in the set of possible actions. As another example, the network output may include respective numerical values defining the parameters of a parametric probability distribution (e.g., the mean and standard deviation of a Normal distribution). In this example, the set of possible actions may be a continuous set (e.g., a continuous range of real numbers). In some of these implementations, the system 100 selects the action to be performed by the agent by sampling an action from the set of possible actions based on the likelihood distribution.

In some implementations, the network output identifies an action from the set of possible actions. For example, if the agent is a robotic agent, the network output may identify the torques to be applied to the joints of the agent. In some of these implementations, the system 100 selects the action identified by the network output as the action to be performed by the agent or adds noise to the identified action and selects the noisy action as the action to be performed.

In some implementations, the network input includes both the observation and a given action from the set of possible actions, and the network output is an estimate of a return that will be received by the system if the agent performs the given action in response to the observation. A return refers to a cumulative measure of reward received by the system as the agent interacts with the environment over multiple time steps. For example, a return may refer to a long-term time-discounted reward received by the system. In some of these implementations, the system 100 can select the action that has the highest return as the action to be performed or can apply an epsilon-greedy action selection policy.

While the policy neural networks all receive the same type of network input and generate the same type of network output, the final policy neural network is generally the most complex neural network in the set. In other words, the final agent policy neural network defines an action selection policy for the agent that is more complex than an action selection policy defined by at least one other candidate agent policy neural network.

As used in this specification, complexity of an action selection policy refers to training complexity, i.e., how difficult it is to train the neural network from scratch to cause the agent to perform the reinforcement learning task using the action selection policy generated by the neural network. One neural network can be more complex than another for a given reinforcement learning task for any of a variety of reasons.

For example, one neural network can generate outputs that define a larger action space for the agent than the other network. In particular, the other candidate network in the set may be constrained to generate a policy that assigns a non-zero likelihood of being selected to only a limited number of the possible actions that can be performed by the agent while the final agent policy neural network's output is not so constrained.

As another example, one neural network can have a more complex neural network architecture than another. For example, the final agent policy neural network may have significantly more parameters than the other networks. As another example, the final agent policy neural network can include certain types of layers that are not included in the other network. As a particular example, the final agent policy neural network can include layers that are generally difficult to train to convergence, e.g., recurrent neural network layers, and that are absent from the other candidate neural networks.

As another example, the reinforcement learning task may be a combination of multiple different individual tasks and one neural network can be a multi-task neural network that generates a respective output for each of the different individual tasks while the other neural network only generates an output for one individual task.

Figure 2A:
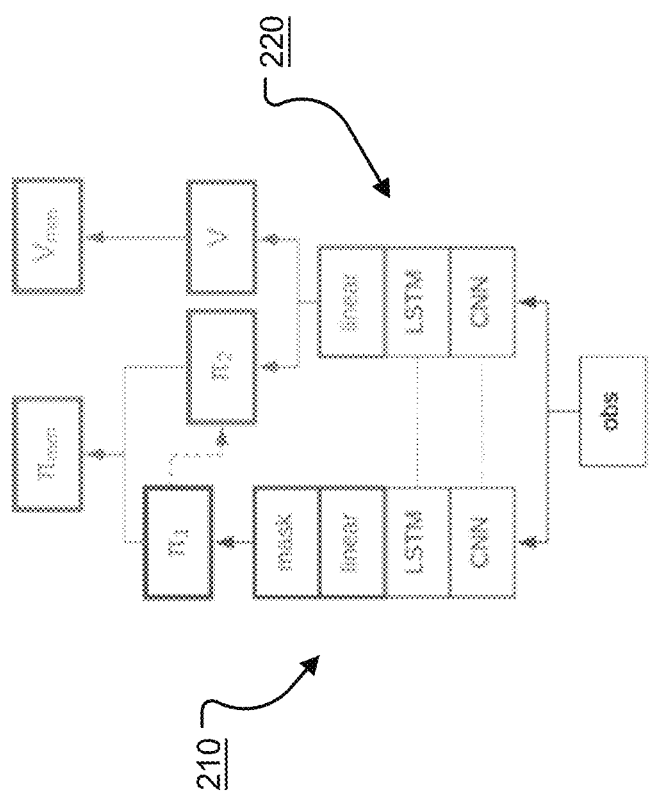
FIGS. 2A-2C are diagrams that show examples of various candidate agent policy neural networks.
Figure 2B:
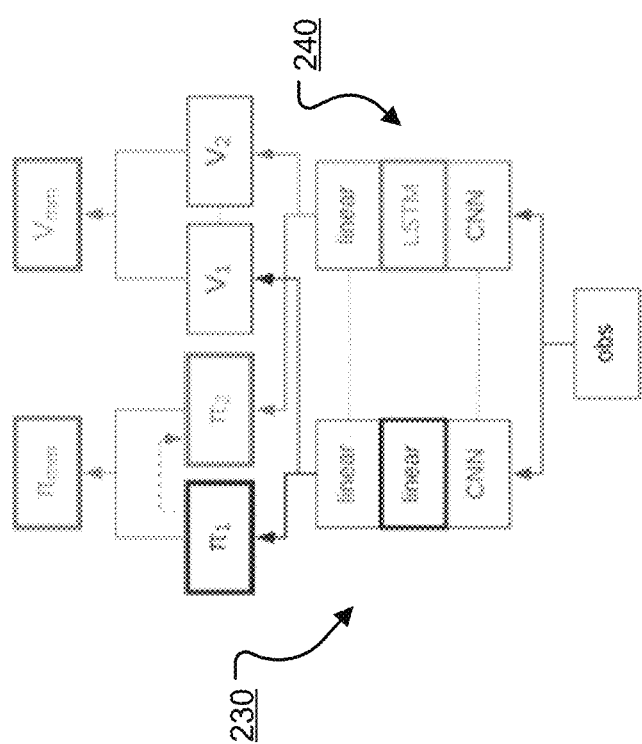
Figure 2C:
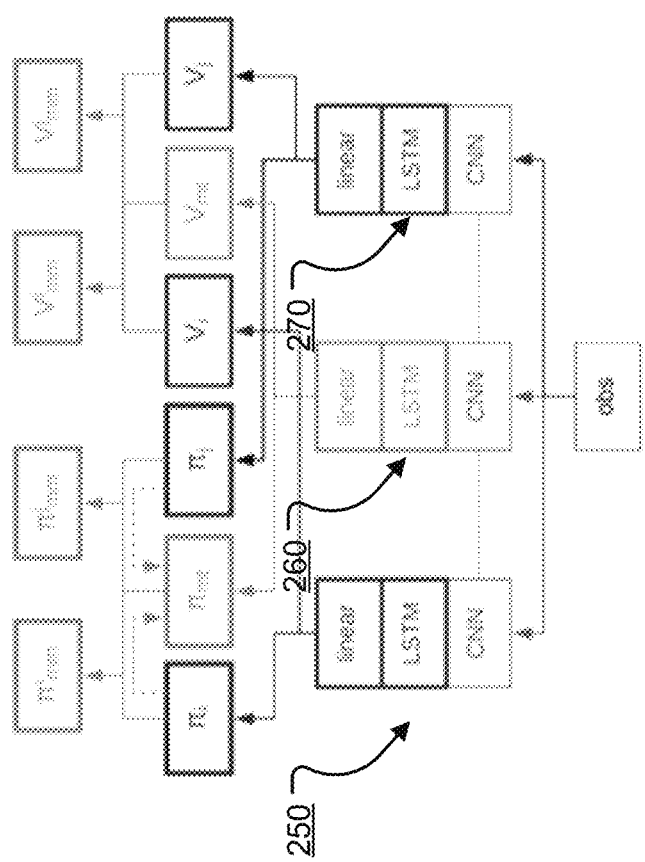

FIGS. 2A-2C are diagrams that show examples of various candidate agent policy neural networks that have different degrees of complexity.

In the example of FIG. 2A, the system is using an actor-critic reinforcement learning technique to train the candidate neural networks. Accordingly, the combined output includes both a combined policy output $\pi_{mm}$ and a combined value output $v_{mm}$.

The combined value output assigns a value to the current state of the environment that is characterized by the received observation "obs." In particular, the value is an estimate of the expected return that would be received by the system if actions are selected according to the current policy starting from the environment being in the current state.

The combined policy output defines the action to be performed by the agent in response to the observation. For example, the combined policy output can be a probability distribution over the set of possible actions to be performed by the agent and the system can select the action by sampling from the probability distribution.

In particular, FIG. 2A illustrates two architectures 210 and 220, with the architecture 220 being more complex than the architecture 210, i.e., being more difficult to train from scratch on the reinforcement learning task. The architectures 210 and 220 can be the architectures of two of the agent policy neural networks included in the set of candidate agent policy neural networks. While in the example of FIG. 2A these are the only two neural networks in the set, in practice the set can also include other candidate agent policy neural networks that are not shown in FIG. 2A.

In the example of FIG. 2A, both architectures 210 and 220 receive an observation ("obs") and process the observation to generate respective policy outputs $\pi 1$ and $\pi 2$. Both architectures include a convolutional encoder neural network followed by one or more long short-term memory (LSTM) layers. In fact, in some implementations, these portions of the architectures 210 and 220 are shared, i.e., the values of the parameters are constrained to be the same between the two architectures.

However, the architecture 210 includes a linear layer followed by a masking operation that sets the probability assigned to a subset of the possible actions in the set to zero. Therefore, the policy output generated by the architecture 210 can assign a non-zero likelihood of being selected to only a limited number of the possible actions that can be performed by the agent. The architecture 220, on the other hand, includes a linear layer that is not followed by a masking operation and therefore the policy output generated by the architecture 220 can assign a non-zero likelihood of being selected to any of the possible actions that can be performed by the agent. Thus, the policy output generated by the architecture 220 defines a larger action space for the agent. While FIG. 2A only shows the linear layer of the architecture 220 generating a value output, in practice the linear layer of architecture 210 may also generate a value output that is mixed (combined) with the value output of architecture 220 to generate the combined value output.

FIG. 2B shows two architectures 230 and 240. The architecture 230 includes a convolutional neural network encoder followed by one or more linear layers and then a final linear layer that generates the policy output and the value output. The architecture 240, however, includes the same convolutional encoder but then includes one or more LSTM layers that are followed by the final linear layer that generates the policy output and the value output. Thus, the architecture 240 is recurrent while the architecture 230 is not. This increases the complexity of the training of the architecture 240 relative to the architecture 230, i.e., because recurrent layers are more difficult to train than feedforward linear layers.

FIG. 2C shows three architectures 250, 260, and 270. In the example of FIG. 2C, the reinforcement learning task includes two individual tasks i and j. The architecture 250 generates an output only for task i while the architecture 270 generates an output only for task j. The architecture 260, on the other hand, generates outputs both for task i and for task j. Thus, although the architectures 250, 260, and 270 are similar in terms of numbers of parameters and include the same types of neural network layers, architecture 270 is more complex to train because it must be trained on both task i and task j while the others only train on a single task.

Returning to the description of FIG. 1, at the outset of the training, the system 100 initializes mixing data that assigns a respective weight to each of the candidate agent policy neural networks in the set. Generally, the mixing data initially assigns a much higher weight to the least complex neural networks in the set than to the most complex neural networks in the set. As a particular example, the system can initially assign a weight of one (or a value close to one) to the least complex neural network in the set while assigning a weight of zero (or a value close to zero) to each other neural network in the set.

The system 100 then trains the candidate agent policy neural networks jointly to perform the reinforcement learning task. In particular, during the training, the system uses, to select actions to be performed by the agent 102, combined action selection policies $\pi_{mm}$ that are a combination (in accordance with the weights in the mixing data) of individual action selection policies generated by the candidate networks in the set.

In particular, this specification will describe the system as combining action selection policies by computing a weighted sum of the individual action selection policies generated by the policy neural networks, i.e., weighted according to the weights in the mixture data. In alternative implementations, the system can instead sample a policy neural network in accordance with the weights in the mixture data and then use the output generated by the sampled policy network as the combined action selection policy.

During the training, the system 100 repeatedly adjusts the values of the parameters of the agent policy neural networks using reinforcement learning.

In particular, the system 100 adjusts the values of the parameters of the agent policy neural networks through reinforcement learning so that the combined action selection policies generated as a result of combining ("mixing") the individual action selection policies generated by the policy networks shows improved performance on the reinforcement learning task.

Moreover, during the training, the system 100 also trains the candidate agent policy neural networks to generate action selection policies that are aligned with other action selection policies generated by the other candidate agent policy neural networks by processing the same training network input. This is referred to as "matching."

Additionally, the system 100 repeatedly adjusts the weights in the mixing data to increasingly favor the more complex agent policy neural networks, including the final agent policy neural network.

Because the weights initially favor the least complex networks and the least complex networks can quickly improve their performance on the reinforcement learning task, the more complex agent policy neural network can initially bootstrap (through the matching updates during training) from solutions found by the simpler networks to assist the more complex networks in learning the tasks. However, while the less complex networks can readily and quickly determine some solution to the task, the solution will generally be a limited one due to the limited capacity of the less complex networks, e.g., due to the limited action space, the limited architectural capacity, and so on of the less complex networks.

By increasing the weight assigned to the more complex networks as training progresses, the more complex networks find better solutions as the combined policy outputs become less reliant on the simple solutions found by the simple networks.

After training, the other candidate networks in the set can be discarded and the final policy neural network can be used to control the agent. Alternatively, the system can provide the final trained values of the parameters of the final policy neural network to another system for use in controlling the agent.

Figure 3:
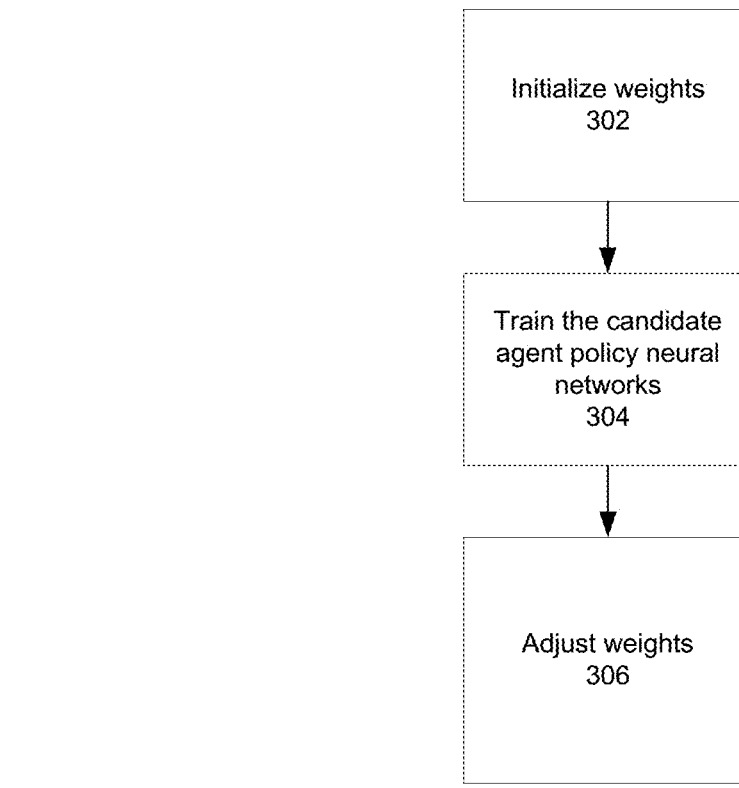
FIG. 3 is a flow diagram of an example process for training the set of candidate agent policy neural networks.

FIG. 3 is a flow diagram of an example process 300 for training the candidate policy neural networks. For convenience, the process 300 will be described as being performed by a system of one or more computers located in one or more locations. For example, a reinforcement learning system, e.g., the reinforcement learning system 100 of FIG. 1, appropriately programmed, can perform the process 300.

The system initializes the mixing data (step 302). In particular, as described above, the system initializes the mixing data to assign higher weights to less complex policy networks than to more complex policy networks.

The system trains the action policy neural networks in the set in accordance with the mixing data (step 304). In particular, the system performs one or more training iterations to update the values of the parameters of the policy networks in the set. During the training, the system updates the values of the parameters of the policy networks to (1) generate combined action selection policies that result in improved performance on the reinforcement learning task and (2) generate action selection policies that are aligned with other action selection policies generated by the other candidate agent policy neural networks by processing the same training network input. Perform an iteration of training the policy neural networks will be described in more detail below with reference to FIG. 4.

The system adjusts the weights in the mixing data (step 306).

In some implementations, the system adjusts the weights using a predetermined annealing scheduling to increase the weights assigned to more complex policy networks. For example, the annealing schedule may specify that the weights assigned to the more complex policy networks are linearly increased while weights assigned to less complex policy networks are linearly decreased as training progresses.

In other implementations, the system employs a population based training technique to update the weights in the mixing data. In this technique, the system trains a population of sets of candidate agent policy neural networks in parallel, i.e., trains multiple different identical sets of candidate agent policy neural networks. During this training, the system periodically adjusts the weights in the mixing data used by lower-performing combinations (populations) based on weights used by higher-performing combinations (populations) using the population-based training technique.

In other words, the system trains a population of sets in parallel, which periodically query each other to check how well they are doing relative to others. Badly performing sets copy the weights (neural network parameters) of stronger sets and the badly performing sets adopt hyperparameters that are local modifications of the hyperparameters of the stronger sets. This way poorly performing sets are used to explore the hyperparameter space.

Training using population based training and techniques for copying parameters and exploring hyperparameters (including the mixing weights) using population based training are described in more detail in Jaderberg, Max, Dalibard, Valentin, Osindero, Simon, Czarnecki, Wojciech M., Donahue, Jeff, Razavi, Ali, Vinyals, Oriol, Green, Tim, Dunning, Iain Simonyan, Karen, Fernando, Chrisantha, and Kavukcuoglu, Koray. Population based training of neural networks. CoRR, 2017, the entire contents of which are hereby incorporated by reference in their entirety.

To evaluate how well a given set of policy networks is performing, the system can evaluate the performance either (i) based on a quality of the combined policy outputs generated by the set during the training or (ii) based only on a quality of policy outputs generated by the final agent policy neural network in the set and not on policy outputs generated by the other agent policy neural networks in the set. As an example the evaluation function can measure either (i) the reward over the last k episodes of the task when controlled using the combined policy or (ii) the reward of the last k episodes of the task if the agent were to be controlled using only the final policy. Evaluating the performance using (i) may achieve good results when the models are considered to have a clear benefit (in terms of performance) of switching from simple to the more complex model. When it is not known if this will be the case, evaluating the performance using (ii) may achieve better results than evaluating using (i).

For an explore function for the weights in the mixture data that defines the local modifications to the weights adopted by the poorly performing sets, the system can randomly add or subtract a fixed value (truncating between 0 and 1).

Thus, using population based training, once there is a significant benefit of switching to more complex one, the switch will occur automatically as part of the exploitation/exploration process.

The system can repeatedly perform steps 304 and 306 to update the parameters of the neural networks and to adjust the weights in the mixing data until some criteria are satisfied, e.g., a certain number of training iterations have been performed or the performance of the final network satisfies some criteria.

Figure 4:
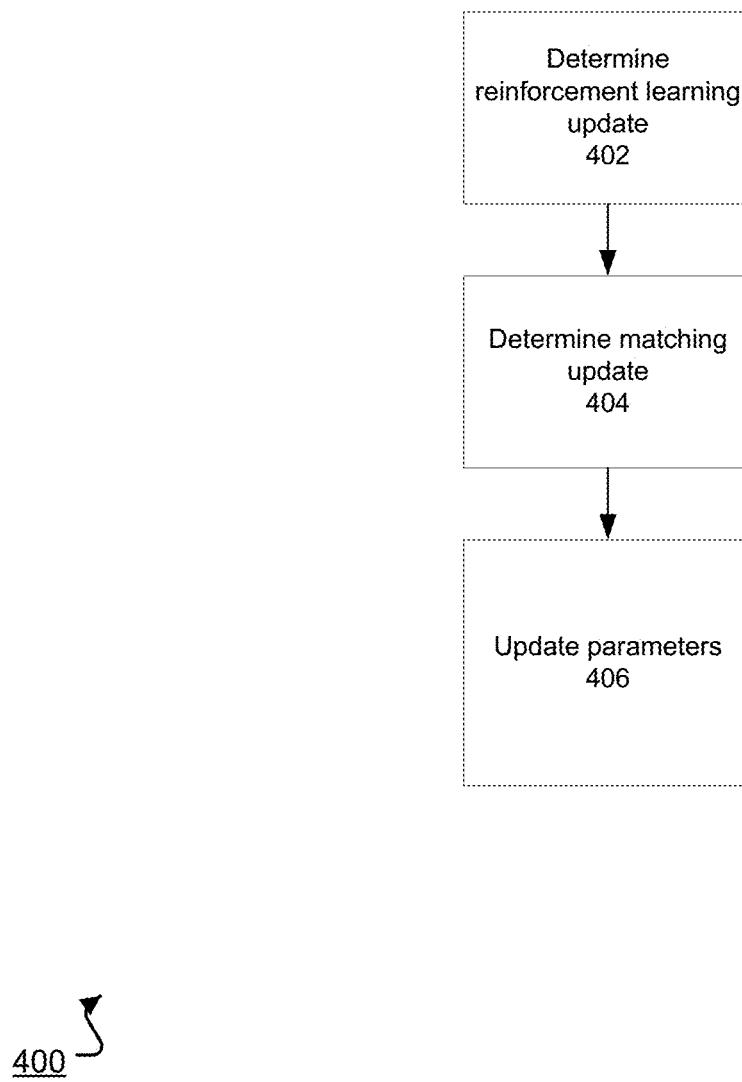
FIG. 4 is a flow diagram of an example process for performing a training iteration.

FIG. 4 is a flow diagram of an example process 400 for performing a training iteration. For convenience, the process 400 will be described as being performed by a system of one or more computers located in one or more locations. For example, a reinforcement learning system, e.g., the reinforcement learning system 100 of FIG. 1, appropriately programmed, can perform the process 400.

When the system is using a population based training technique, the system can perform the process 400 for each candidate set in the population in parallel.

The system determines a reinforcement learning update to the current values of the parameters of the policy neural networks (step 402).

The system can determine the reinforcement learning update using any reinforcement technique that is appropriate for the kinds of network outputs that the policy networks are configured to generate.

In particular, the reinforcement learning technique can be either an on-policy technique or an off-policy technique.

When the technique is an on-policy technique, the system generates training data by controlling the agent in accordance with the current values of the parameters of the policy networks, i.e., by controlling the agent using combined policy outputs generated in accordance with the current values, and then trains the neural networks on the training data.

In more detail, to generate the training data, the system can repeatedly cause the agent to act in the environment until a threshold amount of training data has been generated. To cause the agent to act in the environment, the system receives an observation and processes a network input that includes the observation using each policy using each of the candidate agent policy neural networks to generate a respective action selection policy for each candidate agent policy neural network. The system then combines the action selection policies in accordance with the weights in the mixing data as of the training iteration to generate the combined action selection policy, i.e., by computing a weighted sum of the action selection policies, and then selects an action to be performed by the agent in accordance with the combined action selection policy.

To train the neural network, the system computes gradients of a reinforcement learning loss function, $\mathcal{L}_{RL}$, that is appropriate for the kinds of network outputs that the policy networks are configured to generate and that encourages the combined policies to show improved performance on the reinforcement learning task. Examples of reinforcement learning loss functions for on-policy reinforcement learning include a SARSA loss function and an on-policy actor-critic loss function. In particular, as part of computing gradients, the system backpropagates through the combined policy output into the individual neural networks in the set in order to compute the update to the parameters of the networks.

When the technique is an off-policy technique, the system decouples acting in the environment to generate training data from training on the training data.

In particular, the system generates training data by causing the agent to act in the environment as described above and then stores the training data in a replay memory.

The system then samples training data from the replay memory and uses the sampled training data to train the neural networks. Thus, the training data used at any given training iteration may have been generated using different parameter values than the current values as of the given training iteration. Nonetheless, the training data was generated by controlling the agent using the combined control policy.

To train the neural network, the system computes gradients of an off-policy reinforcement learning loss function that is appropriate for the kinds of network outputs that the policy networks are configured to generate and that encourages the combined policies to show improved performance on the reinforcement learning task. When computing the gradients, the system computes the policies that are inputs to the reinforcement loss function using the combined policy and in accordance with the current weights in the mixing data. Examples of reinforcement learning loss functions for off-policy reinforcement learning include a Q-learning loss function and an off-policy actor-critic loss function. In particular, as part of computing gradients, the system backpropagates through the combined policy output into the individual neural networks in the set in order to compute the update to the parameters of the networks.

The system determines a matching update to the current values of the parameters of the policy neural networks (step 404). Generally, the matching update aligns the action selection policies generated by the policy networks in the set with one another. In some implementations, the system decreases the impact of training the candidate agent policy neural networks to generate action selection policies that are aligned as the weight for the final agent policy neural network is increased, i.e., as training progresses.

In particular, the system obtains a set of observations that were received during interaction with the environment, i.e., that were received as a consequence of controlling the agent using the combined action selection policies. The received observations can be the same as the observations used in computing the reinforcement learning update or can be a different set of observations. For example, when the reinforcement learning technique is an on-policy technique, the observations can be the same observations as in the generated training data. As another example, when the reinforcement learning technique is an off-policy technique, the system can obtain the set of observations from a memory buffer that stores only recently encountered observations, i.e., instead of from the replay memory that stores observations encountered over a longer-term.

The system then computes the matching update by determining gradients of a matching cost function that measures differences in policy outputs generated by the policy networks in the set. In particular, the matching cost function satisfies:

$$\mathcal{L}_{mm}(\theta) = \sum_{i,j=1}^{K} D(\pi_i(\cdot \mid \cdot, \theta_i), \pi_j(\cdot \mid \cdot, \theta_j), i, j, \alpha)$$

where K is the total number of networks in the set and D is a function that measures the differences between the policy outputs generated by policy networks $\pi_i$ and $\pi_j$ for a set of observations given (i) the current values of the parameters of the two policy networks $\theta_i$ and $\theta_j$ and (ii) the current weights a in the mixing data.

As a particular example, the function D between a policy network $\pi_1$ and $\pi_2$ in the set can satisfy:

$$\frac{1-\alpha}{|S|} \sum_{s \in S} \sum_{t=1}^{|s|} D_{KL}(\pi_1(\cdot \mid s_t) \| \pi_2(\cdot \mid s_t)),$$

where S is the set of observations, s is a trajectory of observations in the set, |s| is the number of observations in the trajectory, |S| is the number observations in the set, $D_{KL}$ is the K–L divergence, and the notation (1–α) means 1 minus the weight assigned to the final policy network in the mixing data. In this example, because of the inclusion of the (1–α) term, the system decreases the impact of training the candidate agent policy neural networks to generate action selection policies that are aligned as the weight for the final agent policy neural network is increased.

The system updates the current values of the parameters of the policy neural networks (step 406). That is, the system determines a final update from the reinforcement learning update and the matching update and then adds the final update to the current values of the parameters. The final update can be, e.g., a sum or a weighted sum of the reinforcement learning update and the matching update. Equivalently, the matching cost function $\mathcal{L}_{mm}(\theta)$ may be added to the reinforcement learning loss function $\mathcal{L}_{RL}$ to form the overall loss function used for the training.

The system can continue to repeat the process 400 until criteria for updating the weights in the mixing data are satisfied, e.g., a certain amount of time has elapsed, a certain amount of training iterations have been performed, or until the final policy network achieves an acceptable level of accuracy on the reinforcement learning task This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a final agent policy neural network that is used to select actions to be performed by an agent interacting with an environment to perform a reinforcement learning task, the method comprising:

maintaining data specifying a plurality of candidate agent policy neural networks, wherein each candidate agent policy neural network is configured to process a network input to generate a policy output, wherein the plurality of candidate agent policy neural networks includes the final agent policy neural network, and wherein the final agent policy neural network defines an action selection policy for the agent that is more complex than an action selection policy defined by at least one other candidate agent policy neural network in the plurality of candidate agent policy neural networks;

initializing mixing data that assigns respective weights to each of the candidate agent policy neural networks that define how policy outputs generated by the candidate agent policy neural networks are combined to generate combined policy outputs that are used to select actions to be performed by the agent;

training the plurality of candidate agent policy neural networks jointly to perform the reinforcement learning task, comprising:

during the training, repeatedly generating training data for the plurality of candidate agent policy neural networks by controlling the agent using combined policy outputs generated in accordance with the respective weights for each of the candidate agent policy neural networks in the mixing data, and at each of a plurality of training iterations:

obtaining, from the training data, a reinforcement learning training network input comprising a first observation of the environment, generating, using the candidate agent policy neural networks and in accordance with the weights in the mixing data as of the training iteration, a first combined action selection policy for controlling the agent using the reinforcement learning training network input, determining a reinforcement learning parameter update for the candidate agent policy neural networks using a reinforcement learning technique to generate combined action selection policies that result in improved performance of the agent on the reinforcement learning task, comprising determining a gradient with respect to parameters of the candidate agent policy neural networks of a reinforcement learning loss function that encourages the combined action selection policies to show improved performance on the reinforcement learning task, obtaining, from the training data, a matching training network input comprising a second observation of the environment, generating, using the candidate agent policy neural networks and in accordance with the weights in the mixing data as of the training iteration, a respective second policy output for each candidate agent policy neural network, and determining a matching parameter update for the candidate agent policy neural networks that encourages the candidate agent policy neural networks to generate policy outputs that are aligned with other action policy outputs that generated by the other candidate agent policy neural networks by processing the same training network input, comprising computing a gradient of a matching loss function that measures differences in the respective second policy outputs generated by the candidate agent policy neural networks, and includes one or more terms that decrease an impact of the matching loss function on the training as the respective weight assigned to the final agent policy neural network in the mixing data increases during training; and during the training, repeatedly adjusting the weights in the mixing data to, when generating combined policy outputs that are used to control the agent during the generating of the training data, favor higher-performing candidate agent policy neural networks.

2. The method of claim 1, wherein the final agent policy neural network has more parameters than at least one other candidate agent policy neural network.

3. The method of claim 1, wherein the final agent policy neural network generates outputs that define a larger action space for the agent than at least one other candidate agent policy neural network.

4. The method of claim 1, wherein generating, using the candidate agent policy neural networks and in accordance with the weights in the mixing data as of the training iteration, a combined action selection policy using the training network input comprises:

processing the training network input using each of the candidate agent policy neural networks to generate a respective action selection policy for each candidate agent policy neural network; and combining the action selection policies in accordance with the weights as of the training iteration to generate the combined action selection policy.

5. The method of claim 1, wherein training the plurality of candidate agent policy neural networks jointly to perform the reinforcement learning task comprises:

training a population of combinations of candidate agent policy neural networks, and wherein repeatedly adjusting the weights in the mixing data to favor higher-performing candidate agent policy neural networks comprises:

during the training, adjusting the weights in the mixing data used by lower-performing combinations based on weights used by higher-performing combinations using a population-based training technique.

6. The method of claim 5, wherein a performance of a combination is based on a quality of the combined policy outputs generated during the training.

7. The method of claim 5, wherein a performance of a combination is based only on a quality of policy outputs generated by the final agent policy neural network in the combination and not on policy outputs generated by the other agent policy neural networks in the combination.

8. One or more non-transitory computer readable storage media storing instructions that when executed by one or more computers cause the one or more computers to perform operations for training a final agent policy neural network that is used to select actions to be performed by an agent interacting with an environment to perform a reinforcement learning task, the operations comprising:

maintaining data specifying a plurality of candidate agent policy neural networks, wherein each candidate agent policy neural network is configured to process a network input to generate a policy output, wherein the plurality of candidate agent policy neural networks includes the final agent policy neural network, and wherein the final agent policy neural network defines an action selection policy for the agent that is more complex than an action selection policy defined by at least one other candidate agent policy neural network in the plurality of candidate agent policy neural networks;

initializing mixing data that assigns respective weights to each of the candidate agent policy neural networks that define how policy outputs generated by the candidate agent policy neural networks are combined to generate combined policy outputs that are used to select actions to be performed by the agent;

training the plurality of candidate agent policy neural networks jointly to perform the reinforcement learning task, comprising:

during the training, repeatedly generating training data for the plurality of candidate agent policy neural networks by controlling the agent using combined policy outputs generated in accordance with the respective weights for each of the candidate agent policy neural networks in the mixing data, and at each of a plurality of training iterations:

obtaining, from the training data, a reinforcement learning training network input comprising a first observation of the environment, generating, using the candidate agent policy neural networks and in accordance with the weights in the mixing data as of the training iteration, a first combined action selection policy for controlling the agent using the reinforcement learning training network input, determining a reinforcement learning parameter update for the candidate agent policy neural networks using a reinforcement learning technique to generate combined action selection policies that result in improved performance of the agent on the reinforcement learning task, comprising determining a gradient with respect to parameters of the candidate agent policy neural networks of a reinforcement learning loss function that encourages the combined action selection policies to show improved performance on the reinforcement learning task, obtaining, from the training data, a matching training network input comprising a second observation of the environment, generating, using the candidate agent policy neural networks and in accordance with the weights in the mixing data as of the training iteration, a respective second policy output for each candidate agent policy neural network, and determining a matching parameter update for the candidate agent policy neural networks that encourages the candidate agent policy neural networks to generate policy outputs that are aligned with other action policy outputs that generated by the other candidate agent policy neural networks by processing the same training network input, comprising computing a gradient of a matching loss function that measures differences in the respective second policy outputs generated by the candidate agent policy neural networks, and includes one or more terms that decrease an impact of the matching loss function on the training as the respective weight assigned to the final agent policy neural network in the mixing data increases during training; and during the training, repeatedly adjusting the weights in the mixing data to, when generating combined policy outputs that are used to control the agent during the generating of the training data, favor higher-performing candidate agent policy neural networks.

9. A system comprising one or more computers and one or more storage devices storing instructions that when executed by the one or more computers cause the one or more computers to perform operations for training a final agent policy neural network that is used to select actions to be performed by an agent interacting with an environment to perform a reinforcement learning task, the operations comprising:

maintaining data specifying a plurality of candidate agent policy neural networks, wherein each candidate agent policy neural network is configured to process a network input to generate a policy output, wherein the plurality of candidate agent policy neural networks includes the final agent policy neural network, and wherein the final agent policy neural network defines an action selection policy for the agent that is more complex than an action selection policy defined by at least one other candidate agent policy neural network in the plurality of candidate agent policy neural networks;

initializing mixing data that assigns respective weights to each of the candidate agent policy neural networks that define how policy outputs generated by the candidate agent policy neural networks are combined to generate combined policy outputs that are used to select actions to be performed by the agent;

training the plurality of candidate agent policy neural networks jointly to perform the reinforcement learning task, comprising:

during the training, repeatedly generating training data for the plurality of candidate agent policy neural networks by controlling the agent using combined policy outputs generated in accordance with the respective weights for each of the candidate agent policy neural networks in the mixing data, and at each of a plurality of training iterations:

obtaining, from the training data, a reinforcement learning training network input comprising a first observation of the environment, generating, using the candidate agent policy neural networks and in accordance with the weights in the mixing data as of the training iteration, a first combined action selection policy for controlling the agent using the reinforcement learning training network input, determining a reinforcement learning parameter update for the candidate agent policy neural networks using a reinforcement learning technique to generate combined action selection policies that result in improved performance of the agent on the reinforcement learning task, comprising determining a gradient with respect to parameters of the candidate agent policy neural networks of a reinforcement learning loss function that encourages the combined action selection policies to show improved performance on the reinforcement learning task, obtaining, from the training data, a matching training network input comprising a second observation of the environment, generating, using the candidate agent policy neural networks and in accordance with the weights in the mixing data as of the training iteration, a respective second policy output for each candidate agent policy neural network, and determining a matching parameter update for the candidate agent policy neural networks that encourages the candidate agent policy neural networks to generate policy outputs that are aligned with other action policy outputs that generated by the other candidate agent policy neural networks by processing the same training network input, comprising computing a gradient of a matching loss function that measures a weighted sum of differences in the respective second policy outputs generated by pairs of the candidate agent policy neural networks, and includes one or more terms that decrease an impact of the matching loss function on the training as the respective weight assigned to the final agent policy neural network in the mixing data increases during training; and during the training, repeatedly adjusting the weights in the mixing data to, when generating combined policy outputs that are used to control the agent during the generating of the training data, favor higher-performing candidate agent policy neural networks.

10. The system of claim 9, wherein the final agent policy neural network has more parameters than at least one other candidate agent policy neural network.

11. The system of claim 9, wherein the final agent policy neural network generates outputs that define a larger action space for the agent than at least one other candidate agent policy neural network.

12. The system of claim 9, wherein generating, using the candidate agent policy neural networks and in accordance with the weights in the mixing data as of the training iteration, a combined action selection policy using the training network input comprises:

processing the training network input using each of the candidate agent policy neural networks to generate a respective action selection policy for each candidate agent policy neural network; and combining the action selection policies in accordance with the weights as of the training iteration to generate the combined action selection policy.

13. The system of claim 9, wherein training the plurality of candidate agent policy neural networks jointly to perform the reinforcement learning task comprises:

training a population of combinations of candidate agent policy neural networks, and wherein repeatedly adjusting the weights in the mixing data to favor higher-performing candidate agent policy neural networks comprises:

during the training, adjusting the weights in the mixing data used by lower-performing combinations based on weights used by higher-performing combinations using a population-based training technique.

14. The system of claim 13, wherein a performance of a combination is based on a quality of the combined policy outputs generated during the training.

15. The system of claim 13, wherein a performance of a combination is based only on a quality of policy outputs generated by the final agent policy neural network in the combination and not on policy outputs generated by the other agent policy neural networks in the combination.

16. The method of claim 1, wherein the reinforcement learning training network input and the matching training network input are the same.

17. The system of claim 9, wherein the reinforcement learning training network input and the matching training network input are the same.

* * * * *